US009119258B2

(12) United States Patent
Balazs et al.

(10) Patent No.: US 9,119,258 B2
(45) Date of Patent: Aug. 25, 2015

(54) CURRENT SPLIT CIRCUIT FOR EQUALLY SPLITTING CURRENT BETWEEN PARALLEL CONNECTED LED LUMINAIRE STRINGS

(71) Applicant: General Electric Company, Schenectady, NY (US)

(72) Inventors: Jeno Balazs, Budapest (HU); Szabolcs Szallasi, Pecel (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 16 days.

(21) Appl. No.: 13/786,768

(22) Filed: Mar. 6, 2013

(65) Prior Publication Data
US 2014/0252966 A1 Sep. 11, 2014

(51) Int. Cl.
*H05B 37/02* (2006.01)
*H05B 33/08* (2006.01)
(52) U.S. Cl.
CPC ........ *H05B 33/0842* (2013.01); *H05B 33/0827* (2013.01); *H05B 33/0839* (2013.01)
(58) Field of Classification Search
CPC .... H05B 37/02; H05B 33/08; H05B 33/0827; H05B 33/0839; H05B 33/0842; G05F 1/00
USPC ........... 315/209 R, 291, 307, 308, 312, 185 R
See application file for complete search history.

(56) References Cited

U.S. PATENT DOCUMENTS

| 7,864,142 | B2* | 1/2011 | Tanahashi et al. | 345/82 |
|---|---|---|---|---|
| 8,610,368 | B2* | 12/2013 | Lin et al. | 315/291 |
| 2009/0021508 | A1 | 1/2009 | Ye et al. | |
| 2009/0189846 | A1 | 7/2009 | Nishikawa et al. | |
| 2009/0295776 | A1 | 12/2009 | Yu et al. | |
| 2010/0060175 | A1* | 3/2010 | Lethellier | 315/164 |
| 2011/0254456 | A1 | 10/2011 | Ko | |
| 2012/0326613 | A1* | 12/2012 | Liu | 315/185 R |

FOREIGN PATENT DOCUMENTS

DE 202012104937 U1 1/2013

OTHER PUBLICATIONS

PCT Search Report and Written Opinion issued Apr. 10, 2014 in connection with corresponding PCT Patent Application No. PCT/US2014/012717.

* cited by examiner

*Primary Examiner* — Jimmy Vu
(74) *Attorney, Agent, or Firm* — GE Global Patent Operation; Peter T. DiMauro

(57) ABSTRACT

A system and method for equally splitting the current supplied to parallel connected strings of LEDs. The system and method includes a current splitting circuit such as a mirror circuit that divides the current substantially equally between two or more parallel connected strings of LEDs. The current splitting circuit ensures that illumination levels of the strings of LEDs are uniform without requiring the strings of LEDs to be binned. The current splitting circuit also allows the strings of LEDs to be dimmed in both pulse width modulation (PWM) and continuous modes.

19 Claims, 2 Drawing Sheets

CURRENT SPLIT CIRCUIT FOR EQUALLY SPLITTING CURRENT BETWEEN PARALLEL CONNECTED LED LUMINAIRE STRINGS

I. FIELD OF THE INVENTION

The present invention relates generally to lighting circuits for LED lamps. More specifically, the present invention relates to current split circuits for light emitting diodes (LEDs) used in LED luminaires.

II. BACKGROUND OF THE INVENTION

LEDs are widely used in the lighting field. In many lighting applications, it is desirable to utilize many LEDs having the same illumination level or brightness. However, achieving the same, or substantially the same, illumination level for many LEDs can be difficult and may require substantial cost and effort.

Due to practical considerations, e.g., achieving a similar illumination level, LEDs are often connected in series, i.e., in strings having multiple LEDs. Connecting the LEDs of a lighting system in series also allows the lighting system to achieve a supply voltage that can be delivered by a driver power supply unit (PSU) of the lighting system. Even so, in order to avoid exceeding the highest voltage delivered by the PSU, the serially-connected strings of LEDs are often connected in parallel. However, this configuration also has deficiencies.

Notably, the electrical and thermal parameters of LEDs (and LED strings) are not exactly (100%) identical. These differences are created by various factors including, e.g., manufacturing intolerances, inconsistencies in materials, and the like. LEDs are produced by coating a wafer or substrate with various materials through a chemical process, such as epitaxial growth, doping, and the like, to produce a semiconductor material. The semiconductor material is then sliced to create a small die. Wire bonds or other electrical connectors are then added, e.g., by coating or suspension. The assembly is then encapsulated to create a finished LED package.

Inconsistencies in the coating processes and/or dopant materials create significant inherent variations that impact the characteristics of the LEDs including, voltage, lumens, color (temperature) of the LEDs, and the like. Therefore, placing strings of LEDs in parallel does not guarantee that the current will be split equally between the individual strings of LEDs.

Generally, one string of LEDs (i.e., the "hot" channel) will have more current than the other(s), i.e., the "cold" channel(s). In cases of multiple LED strings being connected in parallel, all the strings of LEDs may have different currents and therefore different illumination levels.

Further, the hot channel will produce more heat (even at the same voltage) and will thus have a higher junction (chip) temperature than the "cold" channel(s). The higher temperature chip tends to carry an increasingly higher current (due to the negative temperature coefficient in terms of voltage-ampere (V-A)) which further increases the temperature of the chip. Correspondingly, the cold channel tends to carry increasingly less current and therefore decreases in temperature. This phenomenon renders parallel connected LED circuits unstable, particularly from a current split standpoint.

Because LEDs emit light depending on current, the performance of the unbalanced LEDs will be suboptimal. In some instances, the high temperature LED, i.e., hot channel, can pull current high enough to damage the lighting device. In this scenario, placing the strings of LEDs in parallel will not resolve the problem as the statistical sum of parameters will not eliminate the effect of the negative temperature coefficient in terms of V-A characteristics.

In recognition of the differences in electrical and thermal parameters, LED manufacturers typically provide a datasheet with the LED string that includes the nominal forward voltage (Vf) for producing white light. The nominal forward voltage for white light may be indicated as, for example, Vf=3.2V. However, the datasheet may also indicate that the forward voltage (Vf) has a minimum value, e.g., Vfmin=2.8V, and a maximum value, e.g., Vfmax=3.6V. Due to the variance of the forward voltage, i.e., the difference between Vfmin and Vfmax, the current between two parallel strings of LEDs will not typically be equal. Therefore, the two parallel strings of LEDs will not have the same illumination level or brightness.

In order to address the electrical and thermal differences, particularly the differences that impact light output and color temperature, manufacturers often group or "bin" the LEDs based on lumen, color and voltage. "Binning" allows luminaire manufacturers to select only the LEDs that meet specific and required performance ranges, e.g., voltage ranges. However, binning can be a complex process that groups the LEDs into smaller bins having tighter control of color variation or larger bins having less control of color variation.

More recently, binning has been standardized to specify a bin size that approximately correlates to with the degree of color variation experienced by commercial compact fluorescent lamp (CFL) sources. However, binning adds substantial costs to the LEDs and still fails to ensure that the current is split equally amongst parallel connected strings of LEDs.

In order to split the current between two or more strings of LEDs, other known solutions have utilized a voltage dropping circuit for each LED string. In these systems, the first LED string uses a current generator as a reference for the other LED strings. However, this solution has the disadvantage of the LED strings not being dimmable in pulse width modulation (PWM) or continuous modes.

III. SUMMARY OF THE EMBODIMENTS OF INVENTION

Given the aforementioned deficiencies, a need exists for systems and methods to split current substantially equally between two or more parallel connected strings of LEDs without the need for binning the strings of LED. It is also desirable to provide a system and method that splits the current equally between two or more parallel connected strings of LEDs and dims the current source in both PWM mode and continuous mode. It is further desirable to provide a system and method that significantly reduces the voltage required to power the system while also ensuring an equal current slit between the parallel connected strings of LEDs.

Embodiments of the present invention provide a lighting circuit including two or more strings of LEDs connected in parallel, and a current splitting circuit including two or more transistors.

In the embodiments, the lighting circuit is configured to split the current supplied by a power supply equally amongst the strings of parallel connected LEDs. The current split circuit includes a reference channel connected to a first string of LEDs and one or more copy channels connected to the other strings of LEDs. The one or more copy channels taps and divides the voltage at the reference channel to ensure that the voltage applied to each string of LEDs is the same.

In at least one aspect, the embodiments provides a lighting circuit including a power source, a first string of solid state lighting devices, a second string of solid state lighting devices, and a current split circuit. The first string of solid state lighting devices includes individual lighting devices connected in series with each other. The second string of solid state lighting devices includes individual lighting devices connected in series with each other.

The current split circuit is in communication with the first string of solid state lighting devices and the second string of solid state lighting devices. The current split circuit includes a first transistor and a second transistor. The first transistor is connected in series with the first string of solid state lighting devices. The second transistor is in communication with the first transistor and is connected in series with the second string of solid state lighting devices.

During the operation of one exemplary embodiment, the current split circuit divides a current substantially equally between the first string of solid state lighting devices and the second string of solid state lighting devices. The first string of solid state lighting devices and the second string of solid state lighting devices are illuminated at substantially the same level of brightness. The first string of solid state lighting devices and the second string of lighting devices are dimmable in both pulse width modulation mode and continuous mode.

In at least another aspect, the embodiments provide a lighting circuit including a power source, a plurality of strings of light emitting diodes, and a current split circuit. Each of the plurality of strings of light emitting diodes is connected to the power source and in parallel with each other. The current split circuit is connected to the plurality of strings of light emitting diodes.

The current split circuit includes a reference transistor and one or more copy transistors. The reference transistor is connected in series with a first of the plurality of strings of light emitting diodes. The one or more copy transistors are each connected in series with one of the plurality of strings of light emitting diodes.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

Figure 1:
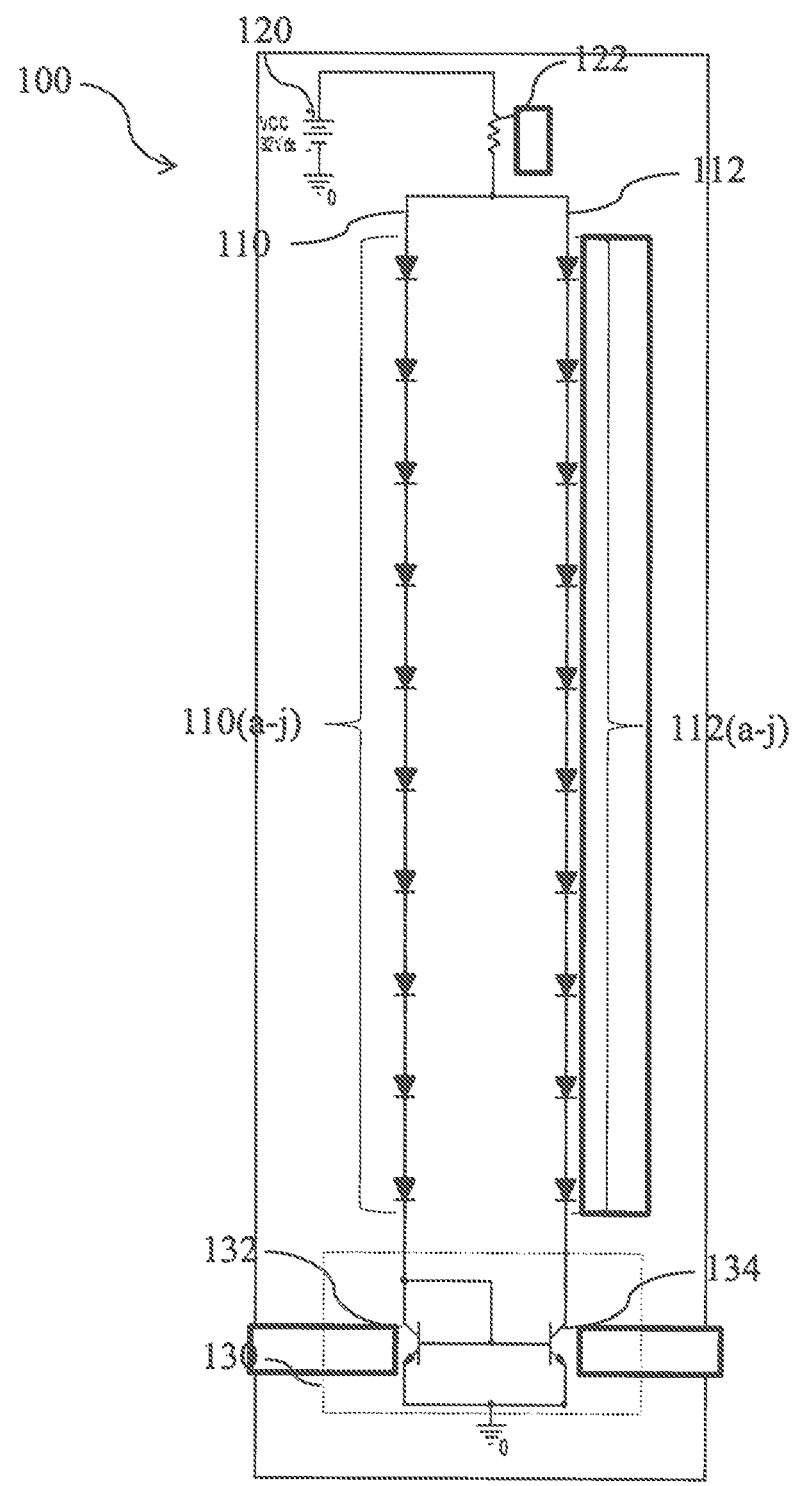
FIG. 1 illustrates a lighting circuit in accordance with an embodiment of the present invention.

The present disclosure may take form in various components and arrangements of components, and in various process operations and arrangements of process operations. The present disclosure is illustrated in the accompanying drawings, throughout which, like reference numerals may indicate corresponding or similar parts in the various figures. The drawings are only for purposes of illustrating preferred embodiments and are not to be construed as limiting the disclosure. Given the following enabling description of the drawings, the novel aspects of the present disclosure should become evident to a person of ordinary skill in the art.

V. DETAILED DESCRIPTION OF EMBODIMENTS OF THE INVENTION

The following detailed description is merely exemplary in nature and is not intended to limit the applications and uses disclosed herein. Further, there is no intent to be bound by any theory presented in the preceding background or summary, or the following detailed description. Those skilled in the art with access to the teachings provided herein will recognize additional modifications, applications, and embodiments within the scope thereof and additional fields in which the invention would be of significant utility.

While embodiments of the present invention are described herein primarily in connection with LEDs, the concepts are also applicable to other types of lighting devices including solid state lighting devices. Solid state lighting devices include, for example, LEDs, organic light emitting diodes (OLEDs), semiconductor laser diodes, and the like. Similarly, while solid state lighting devices are illustrated as examples herein, the techniques and apparatuses disclosed herein are readily applied to other types of light sources, such as incandescent, halogen, other spotlight sources, and the like.

FIG. 1 illustrates a lighting circuit in accordance with embodiments of the present invention. In FIG. 1, a lighting circuit 100 includes two LED strings 110, 112 connected in parallel. The LEDs strings 110, 112 are powered by a constant voltage generator 120 via a resistor 122. The LED strings 110, 112 include individual LEDs 110($a$-$j$) and 112($a$-$j$), respectively. The individual LED 110($a$-$j$) and LED 112($a$-$j$) of each LED string 110, 112, respectively, are connected in series. The LED strings 110, 112 are connected in parallel via a current split circuit 130.

The current split circuit 130 includes two bipolar transistors including, reference transistor 132 and copy transistor 134, arranged as a current mirror. The reference transistor 132 and the LED string 110 form a reference channel 110, 132. The copy transistor 134 and the LED string 112 form a copy channel 112, 134. The copy transistor 134 taps the current at the reference transistor 132 such that the current is split substantially equally between the reference channel 110, 132 and the copy channel 112, 134, i.e., less than approximately a 5% difference in current. The current split circuit 130 thereby allows for uniform illumination of LED strings 110, 112 without the need for binning the LED strings for forward voltage.

Uniform illumination provides that substantially all the LEDs of the LED strings 110, 112, i.e., 90-95% or more of all LEDs, are illuminated at substantially the same illumination levels. As used herein, for example, the term substantially the same illumination levels implies less than 2% variation of illumination such that any differences in illumination levels are not perceptible by the human eye. Eliminating the necessity to bin the LED strings 110, 112 with forward voltage thereby substantially reduces the cost associated with manufacturing LED luminaires. Further, because the lighting circuit 110 does not utilize a voltage drop circuit, it allows the LED strings 110, 112 to be dimmed in both continuous and PWM modes.

While the invention has been described in terms of a current split circuit including bipolar transistors that form a mirror circuit, other current split circuits are envisioned that include other transistor types, e.g., field effect transistors (FETs) or insulated gate bipolar transistors (IGBTs), without departing from the disclosure. It is also noted that while the invention has been described in terms of two strings of LEDs connected in parallel, other embodiments are envisioned that include multiple strings of LEDs connected in parallel, e.g., three, four, or five strings of LEDs, and the like, without departing from the disclosure.

Further, while the invention has been described in terms of a single set of LEDs connected in parallel, embodiments are envisioned having multiple sets of parallel connected LEDs that are connected in series to provide a modular configuration, without departing from the disclosure. Further still, either a constant voltage generator or a constant current generator may be used to power the two or more parallel-connected LED strings without departing from the disclosure.

Figure 2:
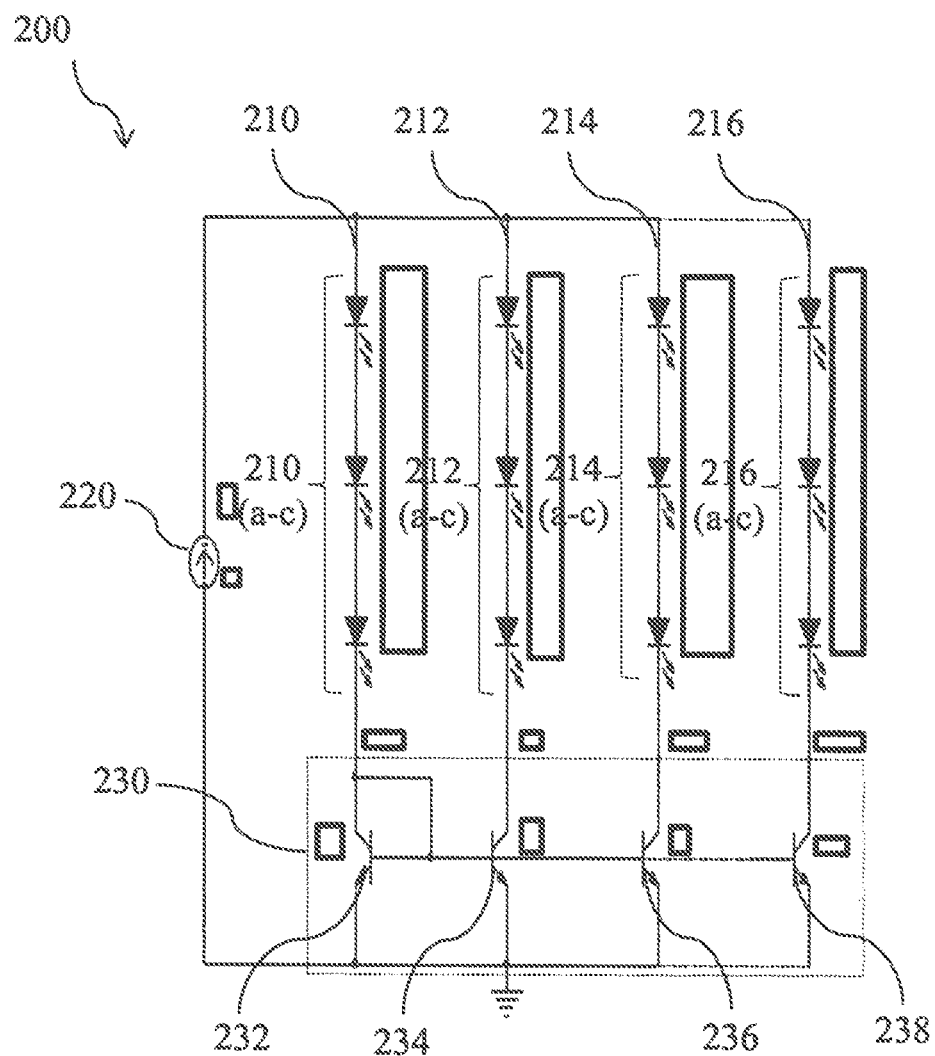
FIG. 2 illustrates a lighting circuit in accordance with an alternative embodiment of the present invention.

FIG. 2 illustrates a lighting circuit in accordance with an alternative embodiment of the present invention. As illustrated in FIG. 2, the lighting circuit 200 includes multiple LED strings, e.g., 210, 212, 214, 216, connected in parallel. The lighting circuit 200 has a similar function as the lighting circuit 100, as discussed above. The lighting circuit 200 has particular utility to further divide the current in applications that require a high number of LEDs and where there is a need to lower the system voltage.

While the embodiment illustrated in FIG. 2 depicts four LED strings, the use of multiple LED strings, e.g., 6, 8, 10, or more strings, is envisioned without departing from the spirit and scope of the present invention. The LED strings 210, 212, 214, 216 are powered by a constant current generator 220. The LED strings 210, 212, 214 and 216, respectively, include individual LEDs 210a-c, 212a-c, 214a-c, and 216a-c. The LED strings 210, 212, 214 and 216 are connected in parallel via a current split circuit 230.

The current split circuit 230 includes multiple bipolar transistors including reference transistor 232 and copy transistors 234, 236 and 238, arranged as a current mirror. The reference transistor 232 and the LED string 210 form a reference channel 210, 232.

A first copy transistor 234 and the LED string 212 form a first copy channel. A second copy transistor 236 and the LED string 214 form a second copy channel. A final copy transistor 238 and the LED string 216 form a final copy channel. The copy transistors 234, 236 and 238 tap the current at the reference transistor 232 such that the current is split substantially equally between the reference channel 210, 232, first copy channels 212, 234, second copy channel 214, 236, and final copy channel 216, 238.

Thus, the current split circuit 230 substantially reduces the overall system voltage by dividing the voltage output by constant current generator 220 multiple times. The current split circuit 230 also allows for uniform illumination of the multiple LED strings 210, 212, 214 and 216 without the need for binning the LED strings for forward voltage. Additionally, the current split circuit 230 allows the multiple LED strings 210, 212, 214 and 216 to be dimmed in both continuous and PWM modes.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. A lighting circuit, comprising:
  a plurality of strings of light emitting diodes connected to a power source, the plurality of strings of light emitting diodes being connected in parallel with each other; and
  a current split circuit connected to the plurality of strings of light emitting diodes, the current split circuit comprising a plurality of transistors, each transistor being directly connected to the power source, including:
    a reference transistor connected in series with a first of the plurality of strings of light emitting diodes, and one or more copy transistors connected to the reference transistor and in series with one of the plurality of strings of light emitting diodes, wherein the one or more copy transistors divides the current substantially equally between the plurality of strings of light emitting diodes, wherein the plurality of transistors divide the voltage output by the power source multiple times.

2. The lighting circuit according to claim 1, wherein each of the plurality of strings of light emitting diodes includes multiple light emitting diodes.

3. The lighting circuit according to claim 1, wherein the power source is a constant voltage generator.

4. The lighting circuit according to claim 1, wherein the power source is a constant current generator.

5. The lighting circuit according to claim 1, wherein the current split circuit controls the illumination levels of the plurality of strings of light emitting diodes to be substantially uniform.

6. A lighting method, comprising:
  providing a power source;
  providing a plurality of strings of light emitting diodes in communication with the power source, the plurality of strings of light emitting diodes being connected in parallel with each other;
  providing a current split circuit in communication with the plurality of strings of light emitting diodes, the current split circuit having a plurality of transistors that form a mirror circuit, each transistor being directly connected to the power source;
  dividing the current equally between each of the plurality of strings of light emitting diodes such that the light emitting diodes are illuminated at substantially the same level; and
  dividing, by the plurality of transistors, the voltage output by the power source multiple times.

7. The lighting method according to claim 6, further comprising dimming the plurality of strings of light emitting diodes.

8. The lighting method according to claim 7, wherein the plurality of strings of light emitting diodes are dimmable in pulse width modulation mode.

9. The lighting method according to claim 7, wherein the plurality of strings of light emitting diodes are dimmable in continuous mode.

10. A lighting circuit comprising:
  a plurality of strings of lighting devices configured to emit light;
  a power source configured to supply power to the plurality of strings of lighting devices; and
  a current split circuit comprising:
    a plurality of transistors in communication with each other, and configured to control the power supplied to the plurality of strings of lighting devices, wherein the plurality of strings of lighting devices are in parallel with each other via the current split circuit, and each string of lighting devices is connected in series with only a transistor within the plurality of transistors, and a transistor of the plurality of transistors taps a current at another transistor of the plurality of transistors such that the current split circuit divides the current substantially equal between the plurality of lighting devices, wherein each transistor is directly connected to the power source, and the plurality of transistors divide the voltage output by the power source multiple times.

11. The lighting circuit according to claim 10, wherein the current split circuit includes:

a first transistor connected in series with a first string of lighting devices; and, a second transistor in communication with the first transistor and connected in series with a second string of lighting devices, wherein the current split circuit is configured to divide a current substantially equally between the first string of lighting devices and the second string of lighting devices.

12. The lighting circuit according to claim 11, further comprising:

a third string of lighting devices in communication with the power source, the third string of lighting devices being connected in series; and a fourth string of lighting devices in communication with the power source, the fourth string of lighting devices being connected in series; and the current split circuit further comprising:

a third transistor in communication with the second transistor and connected in series with the third string of lighting devices; and, a fourth transistor in communication with the third transistor and connected in series with the fourth string of lighting devices, the current split circuit being configured to divide the current substantially equally between the third string of lighting devices and the fourth string of lighting devices.

13. The lighting circuit according to claim 12, wherein the current is divided substantially equally between the first string of lighting devices, the second string of lighting devices, the third string of lighting devices, and the fourth string of lighting devices.

14. The lighting circuit according to claim 11, wherein the first transistor and the second transistor form a mirror circuit that controls the illumination levels of the first string of lighting devices and the second string of lighting devices to be substantially uniform.

15. The lighting circuit according to claim 11, wherein the lighting devices are unbinned, wherein the lighting devices are not grouped based on similarities in lumen, color or voltage.

16. The lighting circuit according to claim 10, wherein the power source is a constant voltage generator.

17. The lighting circuit according to claim 10, wherein the power source is a constant current generator.

18. The lighting circuit according to claim 10, wherein the lighting devices are light emitting diodes.

19. The lighting circuit according to claim 10, wherein the plurality of strings of lighting devices are dimmable in at least one of a pulse width modulation mode and a continuous mode.

* * * * *